United States Patent [19]

Nadas

[11] Patent Number: 4,706,786
[45] Date of Patent: Nov. 17, 1987

[54] BRAKE LINKAGE FOR VEHICLE BRAKES

[75] Inventor: Julius Nadas, Eching, Fed. Rep. of Germany

[73] Assignee: Knorr-Bremse AG, Munich, Fed. Rep. of Germany

[21] Appl. No.: 822,566

[22] Filed: Jan. 27, 1986

[30] Foreign Application Priority Data

Jan. 25, 1985 [DE] Fed. Rep. of Germany ....... 3502560

[51] Int. Cl.[4] ..................... F16D 55/02; F16D 65/38; F16D 65/52
[52] U.S. Cl. ............................ 188/196 BA; 188/71.9; 188/200
[58] Field of Search ............ 188/2 D, 59, 71.9, 196 F, 188/196 B, 196 BA, 196 V, 200, 202, 203, 79.5 GE

[56] References Cited

U.S. PATENT DOCUMENTS

| | | | |
|---|---|---|---|
| 1,434,678 | 11/1922 | Chandeson | 188/59 |
| 3,876,043 | 4/1975 | Frania et al. | 188/59 X |
| 4,592,451 | 6/1986 | Persson | 188/71.9 |

FOREIGN PATENT DOCUMENTS

| | | | |
|---|---|---|---|
| 2346828 | 3/1975 | Fed. Rep. of Germany | 188/71.9 |
| 2727473 | 3/1978 | Fed. Rep. of Germany | 188/59 |
| 3326374 | 1/1985 | Fed. Rep. of Germany | 188/203 |

Primary Examiner—Andres Kashnikow
Assistant Examiner—Robert J. Oberleitner
Attorney, Agent, or Firm—Pollock, Vande Sande & Priddy

[57] ABSTRACT

The pull- or push rod of a brake linkage, preferably in the form of a brake clamp, features a double spindle (21) whose oppositely directed threaded ends (20) are screwed into nuts (14) which have a self-locking thread and are hinged to brake levers (4). A flat spiral spring (23) continuously loads the double spindle (21) in the direction of rotation for brake clearance adjustment, while a rotary lock keeps the double spindle (21) in place when the brakes are released. Upon achievement of an application stroke or pressure, for the brakes, the rotary lock is released, and by turning the double spindle (21), excessive play of the brakes at the beginning of the braking process is compensated immediately and completely.

5 Claims, 4 Drawing Figures

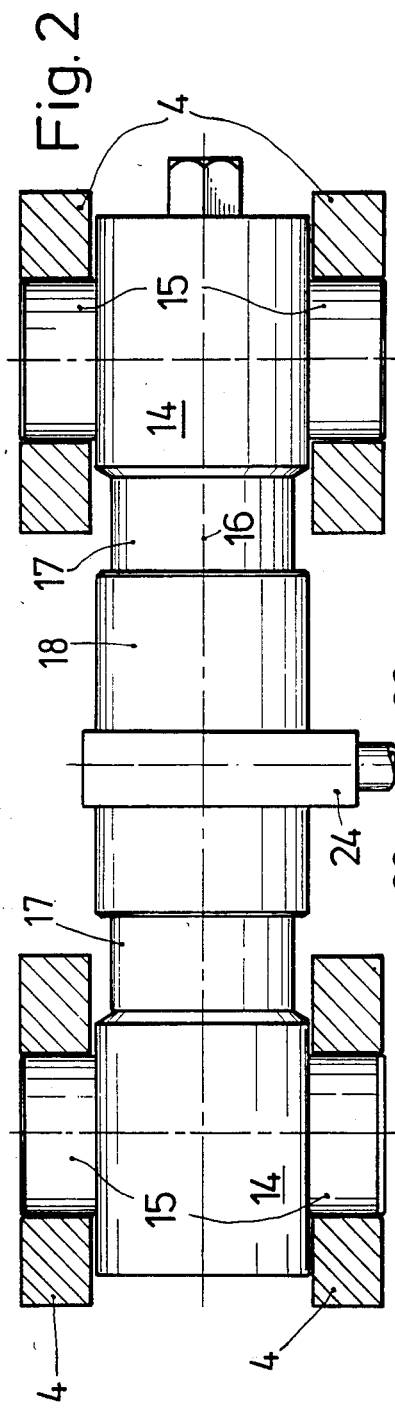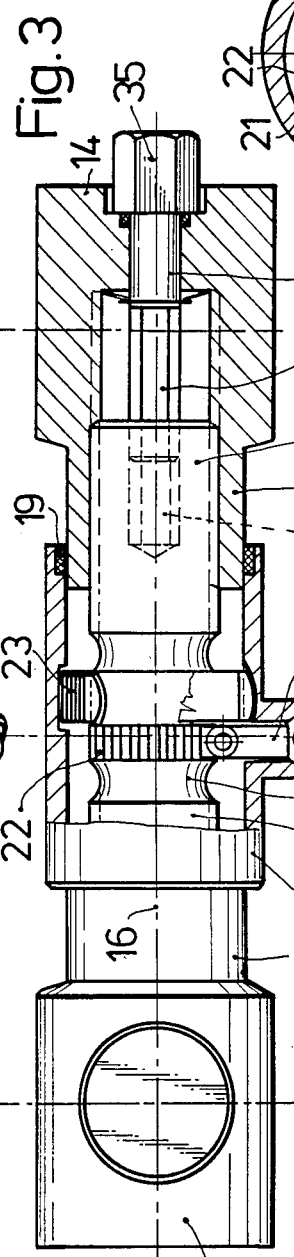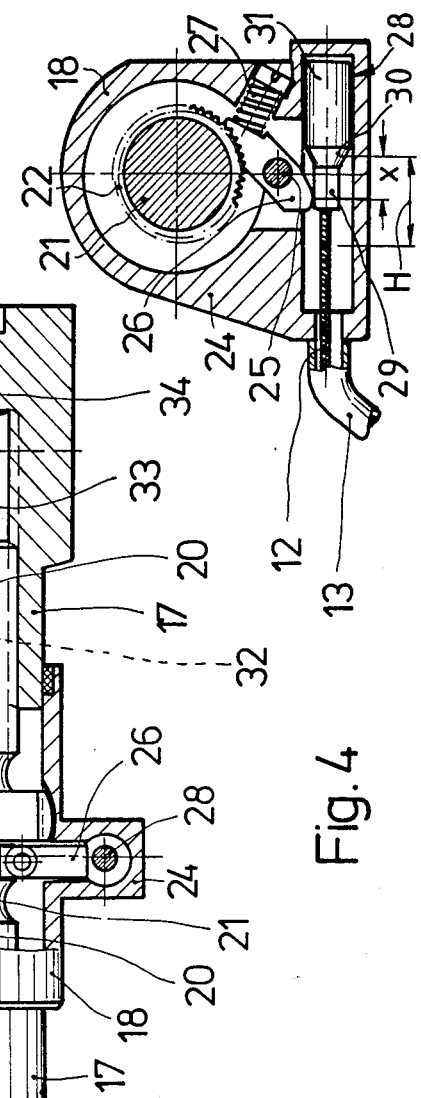

BRAKE LINKAGE FOR VEHICLE BRAKES

FIELD OF THE INVENTION

The invention concerns a brake linkage for vehicle brakes featuring a play-adjustment device of adjustable length, which is located between two brake linkage parts and can be loaded for pull or push by means of a brake actuating force generated by a brake force motor, especially a brake clamp for rail vehicle disc brakes with a pull rod designed as a play adjustment device, the latter containing a threaded spindle drive, one part of which is rotatable and the other retained against rotation.

BACKGROUND OF THE INVENTION

A brake clamp in accordance with the above mentioned characteristics is disclosed by German Published Patent Application No. 23 46 828. Here, the rotary part of the threaded spindle drive is designed as a double spindle with counterwound threads, the thread being screwed into nuts hinged to the brake-clamp levers. One end of the double spindle is provided with a ratchet-like rotary drive unit, which, depending on the lift of the brake force motor, can be operated by means of a Bowden wire. An immediate and thorough adjustment at the beginning of the braking process, however, is not possible through the known play-adjustment device.

According to German Patent Application No. P 33 26 374, with no prior publication, a separate auxiliary-force motor operated prior to the brake force motor is provided for the play-adjustment device, designed as the pull rod of a brake clamp. The structure of this play-adjustment device has many parts and is thus costly; furthermore, a considerable mounting area is required for the auxiliary motor.

OBJECT OF THE INVENTION

An object of the invention is a brake linkage of the type described in which, with a simple, compact and therefore economical and space-saving installation, the play adjustment device has a spring compensation function that is independent of the path of rotation and effective immediately, i.e., it immediately and completely adjusts any excessive play at the start of the braking process.

SUMMARY OF THE INVENTION

According to the invention, this objective is achieved by the continuous loading of the rotatable part of the threaded spindle drive, featuring a self-locking threading, in the rotational direction to be adjusted, by means of a torsion spring, and, for this rotatable part, the provision of a rotatable lock, which is controlled, with regard to lift and power, by the brake force motor, and which opens upon triggering of the braking process.

BRIEF DESCRIPTION OF THE DRAWINGS

The drawings show an embodiment of the brake linkage according to the invention, which will now be described:

FIG. 2 is a view, partly in cross-section, of the pull-rod of the brake clamp;

FIG. 3 is a partly-sectioned view of the pull rod, turned around its longitudinal axis by 90°; and FIG. 4 is a cross-section through the pull rod.

DETAILED DESCRIPTION

Figure 1:
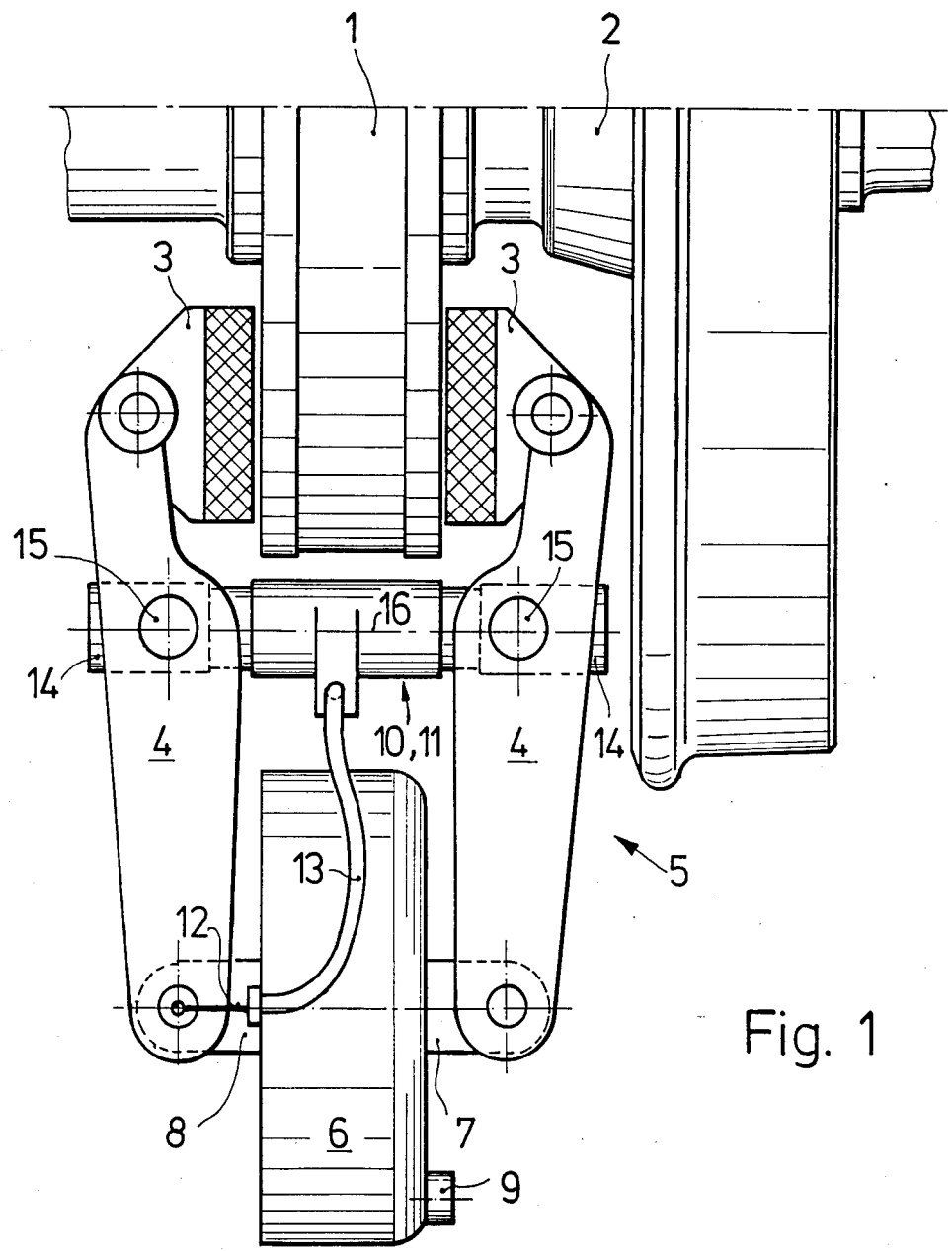
FIG. 1 shows a brake linkage in the form of a brake clamp for a disc brake, in a scaled down version.

FIG. 1 shows part of a set of wheels 2 of a rail vehicle, provided with a brake disc 1. Brake grippers, which are hinged to the ends of the brake-clamp's brake levers 4 of a brake linkage in the form of a brake clamp 5, can be pressed against both sides of the brake disc 1. At their other ends, the two brake levers 4 are hinged to a bearing lug 7, which is connected with the cylinder body of a brake cylinder 6, or to the piston rod 8 of the brake cylinder 6. The brake cylinder 6, representing a brake force motor and being dimensioned accordingly, is conventionally retained within the vehicle in a fixed or floating manner; it can be actuated via a pipe connection 9 by means of brake pressure air required for the extension of the piston rod 8, and which is regulated depending on the desired braking power. In their central parts, and between their end hinges on both sides, the two brake levers 4 are flexibly linked to each other by means of a pull rod 11 in the form of a play adjustment device 10. The core 12 of a Bowden wire 13, whose sheathing end is held by the brake cylinder housing, is attached to the hinge of the piston rod 8, at the brake lever 4 which is assigned to it. The Bowden wire 13 extends to the play adjustment device 10. The pull rod 11 comprises two nuts 14, which are flexibly attached between the two cheeks of the brake-levers 4, and can be pivoted around the bearings 15; they can, however, not be rotated around the perpendicular axis of the axis 16.

According to FIGS. 2 and 3, the nuts 14 have mutually facing cylinder necks. The left cylinder neck 17, at the left in FIG. 3, is firmly connected to a casing 18, which extends to the right cylinder neck 17 and can be drawn over it along its longitudinal axis by means of a sealing ring 19, thereby avoiding the entry of dirt. The two nuts 14 are screwed into the two thread-endings, provided with reversely directed threading 20 of a double spindle 21. In its central regions, between the two cylinder necks 17, the double spindle 21 has a ratchet wheel 22 (FIGS. 3 and 4), which is covered by the casing. In addition to the ratchet wheel 22, there is also a spiral spring 23, which surrounds the double spindle 21. The outer end of the spiral spring 23 is attached to the casing 18, while the inner end is non-rotatably connected to the double spindle 21; because of its pre-tension, the spiral spring 23 permanently loads the double spindle 21 in a direction of rotation spring 23, which, by means of the self-locking threads of the threaded endings 20, seeks to screw the double spindle 21 into the nuts 14 in the direction of mutual approach of the latter. A pawl 26 rotatable about a pin 25 is mounted in a projection 24 of the casing 18, which is loaded in the direction of engagement into the gear tooth system of the ratchet wheel 22, by means of a spring 27. Furthermore, a switching plunger 28 that can be displaced diagonally with respect to the double spindle 21 is also located in the projection 24; this switching plunger has a neck 29 which has a small diameter and does not affect the pawl 26, and which, via a conical intermediate section 30, changes over into a longer section 31 of a greater diameter (FIG. 4). When, as seen in FIG. 4, the switching plunger 28 is moved to the left, section 31 contacts the pawl 26 by means of intermediate section 30, and disengages it from the ratchet wheel against the force of the spring 27. On the side of the neck 29, the switching plunger 28 is coupled to the core 12 of the Bowden wire 13, whose sheathing is supported by the casing attachment 24.

When the brake is released, all parts of the brake clamp 5, with the pull rod 11 and the play adjustment devices 10 integrated thereto, assume the positions indicated by the drawings. Pull rod 11 takes on such a length that the brake grippers 3 are lifted from the brake disc 1 by a minimal play. Under the influence of the force of the spring 27, the pawl 26 engages the gear-tooth system of the ratchet wheel 22 and prevents the double spindle 21 from rotating. If, in order to apply the brakes, the brake cylinder 6 is acted upon by pressure media through the pipe connection 9, then the piston rod 8 begins to extend in order to apply the brake, the brake levers being pivoted around the bearings 15 with the objective of bringing the brake grippers 3 closer to the brake disc 1, and the core 12 of the Bowden wire 13 being pulled out from its housing on the side of the brake cylinders. In the course of this, the Bowden wire 13 moves the switching plunger 28 to the left (as seen in FIG. 4), whereby, after covering a minimal lifting distance x, intermediate section 30 and section 31 disengage the pawl 26 from the ratchet wheel 22. This releases the double spindle 21 for rotating movement. With correct play, it is particularly in this lifting position that the brake grippers 3 are applied to the brake disc 1, so that the spiral spring 23 cannot rotate the double spindle 21 in the direction of approach of the two nuts 14, because the brake grippers 3, which are adjacent to the brake disc 1, offer great resistance to such a screw-tightening rotation by means of the brake levers 4. If the brake cylinder 6 is further acted upon by pressure media, the former spreads the brake levers 4 apart with great force, whereby, under the influence of the appropriate tension of pull rod 11 and thus also of the play adjustment device 10, the brake grippers 3 are pressed with great force onto the brake disc 1. Due to the elastic deformations occurring in this process, the piston rod 8 carries out a certain additional lift of the piston, which, by means of the Bowden wire 13 causes a displacement of the switching plunger 28 to the left (as seen in FIG. 4), departing from the illustrated rest position by a maximal lifting distance H, section 31 sliding under the pawl 26, keeping the latter disengaged from the ratchet wheel 22. The pulling stress of the play adjustment device 10 extends through the self-locking screw threads on both sides of the double spindle 21 with the nuts 14, causing high frictional forces, which securely prevent the double spindle 21 from rotating.

During the subsequent releasing process, reversed processes take place in which the switching plunger 28 is pushed back by means of the Bowden wire 13 into the position shown in FIG. 4. At the moment when the brake grippers 3 have reached a state of nearly force-free application to the brake disc 1, the intermediate section 30 slides along below the pawl 26, whereby the latter is again released and engages with the ratchet wheel 22, under the force of the spring 27; the double spindle 21 is thus again locked against rotation by the rotary lock consisting of the pawl wheel 22 and the ratchet 26. During the subsequent residual lift by the lifting distance x, the neck 29 moves beneath the pawl 26, and the brake grippers 3 are lifted from the brake disc 1 by the minimal, desired play.

Should there be excessive play between the brake grippers 3 and brake disc 1 at the beginning of the braking process, this is due to the fact that, at the particular moment when the pawl 26, as previously described, is disengaged from the ratchet wheel 22 by overrunning intermediate section 30 and section 31, the brake grippers do not yet abut the brake disc 1.

The pull rod 11 and the play adjustment device 10 are not yet under the influence of the pulling stress, and, consequently, only minimal friction exists in the threading between the double spindle 21 and the nuts 14. The spiral spring 23 can thus turn the double spindle 21, whereby both nuts 14 are screwed in the direction of mutual approach on the thread endings 20, until the brake grippers 3 abut the brake disc 1 and a pulling stress acting in opposition to a further screwing process occurs in the pull rod 11. The subsequent braking process, as well as the subsequent releasing process, take place as already described. It can be noted that the excessive brake venting play is completely adjusted immediately upon beginning of the braking process.

In the case of an exchange of worn-out brake grippers 3 for new brake grippers 3, the pull rod 11 must be elongated by retracting the play adjustment device 10, such that when the brake is released, the new brake grippers 3 can be inserted between the brake levers 4 and the brake disc 1. For this purpose, and as can be seen in FIGS. 2 and 3 in particular, the double spindle 21 can be provided on one side with an axial recess having a profiled contour, e.g., hexagonal and of the blind-hole type, into which a correspondingly profiled section 33 of drive element 34 locks non-rotatably but axially displaceably. The drive element 34 passes rotatably through one of the nuts 14, and terminates outside the latter with a profiled surface section in the form of a hexagon head 35. Upon application of a suitable turning tool, such as a wrench, to the hexagonal head 35, the drive element 34 and thus the double spindle 21 can be so turned that both nuts 14 are screwed in the mutually-separating direction, while simultaneously, the spiral spring 23 is tensioned. By corresponding configuration of the teeth of the ratchet wheel 22, the latter passes underneath the pawl 26. After insertion of the new brake grippers, appropriate turning of the drive element 34 can produce the desired play between the brake grippers 3 and the brake disc 1, with pawl wheel 22 again passing underneath the ratchet 26.

Through conventional adjustment of the Bowden wire 13, and especially of the length of its sheathing, the dimension of the lifting distance x can be adjusted through an appropriate displacement of the switching plunger 28 in the brake release position; since the lifting distance x is proportional to the desired play between the brake grippers 3 and the brake disc 1, not only the lifting distance x, but also the dimension of the desired play, which is to be kept constant automatically by the play adjustment device, is adjusted.

The above-described play adjustment device, which is integrated into the pull rod 11, can also be used with brake linkages which deviate from the brake clamp structure according to FIG. 1, e.g., H-brake linkages. By inverting the direction of rotation of the torsional load exerted on the double spindle 21 by the spiral spring 23, and by corresponding adjustment of the control for the pawl 26, it is also possible to incorporate the play adjustment device into the pressure rod of a brake linkage pressure-loaded during the braking process. Here, too, during the disengagement of the pawl 26, with the play adjustment device free of pressure load, the double spindle causes immediate and complete adjustment of play at the beginning of the braking process by being turned, in this case, in a screwing direction which moves the two nuts away from each other.

Instead of constituting the rotary lock, consisting of the ratchet wheel 22 and the pawl 26, so that it involves a ratchet-system when acted upon by a torque load, the pawl 26 could also be operated by means of a manual device to be operated by voluntary turning of the double spindle 21 through the drive element 34 in order to disengage the pawl 26.

A further modification would be to provide for a switchable free-wheel instead of the rotary lock 22, 26. Furthermore, instead of the double spindle 21, a simple spindle with a threaded section on only one side of the ratchet, rotatable at one of the two brake levers, but axially non-displaceable, could be provided. And finally, in accordance with a further modification, it is possible to provide a control different from the motion-control for the switching plunger 28 through the Bowden wire 13; in particular, the switching plunger could be movable by means of a piston which is actuated by the admission pressure of the brake cylinder 6 against the force of a spring, and could be moved together with the switching plunger upon reaching the brake application admission pressure. To this end, the switching plunger could itself be in the form of such a piston.

What is claimed is:

1. Brake clamp for a vehicle disc brake with a play adjustment device including a pull rod (11) of adjustable length located between two brake clamp levers (4) and loaded by a brake application force exerted by a brake force motor (6), said play adjustment device (10) comprising a threaded spindle drive having a rotatable double spindle (21) with reversely self-locking threaded end portions (20) and two non-rotatable nuts (14) held by said brake clamp levers (4), said end portions (20) being screwed into said nuts (14), wherein said double spindle (21) is continuously loaded by a pre-stressed spiral spring (23) in a direction of rotation to approach said nuts (14), wherein said nuts (14) have mutually-facing cylindrical necks (17), a casing (18) being connected to one of said necks and extending to the other of said necks, an outer end of said spiral spring (23) being attached to said casing (18) and an inner end of said spiral spring (23) being attached to said double spindle (21), and wherein a rotary lock (22, 26) controlled by a movable part (8) of said brake force motor (6) and opening upon movement of said movable part (8) for an application stroke of a brake clamp, is provided for said double spindle (21).

2. Brake linkage according to claim 1, including a ratchet wheel (22) forming part of said rotary lock located between said end portions (20) and adjacent to said spiral spring (23).

3. Brake linkage according to claim 2, wherein said casing (18) is axially slidable over said other of said necks (17), to prevent contamination.

4. Brake linkage according to claim 2, wherein said double spindle (21) is non-rotatably but axially-displaceably coupled with a coaxial drive element (34), passing through one of said nuts (14) in a rotatable but axially non-displaceable manner, said drive element having a profiled surface section, configured to permit the application of a turning tool.

5. Brake linkage according to claim 5, wherein said ratchet wheel (22) cooperates with a resilient locking pawl (26), supported in said casing (18) and disengaged both when the torque load of said double spindle (21) in a direction of rotation counter to the force of said spiral spring (23) exceeds a limiting value, and by means of a manual device operated by voluntary turning of said double spindle (21).

* * * * *